(12) United States Patent
Kementsietsidis et al.

(10) Patent No.: US 9,069,808 B2
(45) Date of Patent: Jun. 30, 2015

(54) INDEXING PROVENANCE DATA AND EVALUATING PROVENANCE DATA QUERIES IN DATA PROCESSING SYSTEMS

(75) Inventors: Anastasios Kementsietsidis, White Plains, NY (US); Min Wang, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 1283 days.

(21) Appl. No.: 12/469,290

(22) Filed: May 20, 2009

(65) Prior Publication Data
US 2010/0299339 A1 Nov. 25, 2010

(51) Int. Cl.
G06F 7/00 (2006.01)
G06F 17/30 (2006.01)
G06F 17/00 (2006.01)

(52) U.S. Cl.
CPC .... *G06F 17/30321* (2013.01); *G06F 17/30312* (2013.01)

(58) Field of Classification Search
CPC ....................... G06F 17/30312; G06F 17/3002
USPC .................................... 707/741, 999-999.005
See application file for complete search history.

(56) References Cited

U.S. PATENT DOCUMENTS 5,572,670 A * 11/1996 Puckett ............................ 714/46
6,038,339 A * 3/2000 Hubel et al. .................... 382/162

(Continued)

FOREIGN PATENT DOCUMENTS

WO WO2007082830 7/2007

OTHER PUBLICATIONS

Wang, L., Peng, Z., Luo, M., et al. 2006. A scientific workflow framework integrated with object deputy model for data provenance. In Proceedings of the 7th International Conference on Web-Age Information Management, HongKong, China, Mar. 2006, Jeffrey X. Y., Masaru K. and Hong V. L., Eds. Springer Berlin, 569-580.*

(Continued)

*Primary Examiner* — Kannan Shanmugasundaram
(74) *Attorney, Agent, or Firm* — Preston J. Young; Ryan, Mason & Lewis, LLP

(57) ABSTRACT

Techniques for indexing provenance data and evaluating provenance data queries are disclosed. For example, a method for processing one or more queries directed toward data associated with a data processing system comprises the following steps. One or more data items of a first data set associated with the data processing system are mapped to a first representation type and one or more data items of a second data set associated with the data processing system are mapped to a second representation type. A bi-directional index of a data provenance relation existing between the data items of the first data set and the data items of the second data set is computed. The bi-directional index is computed in terms of the first representation type and the second representation type. A query evaluation is performed using the bi-directional index, in response to receipt of a provenance query. The bi-directional index is used for query evaluation whether the received provenance query is a backward provenance query or a forward provenance query. A response is generated for the received provenance query based on a result of the query evaluation. In one further example, the provenance query evaluation step may be performed by using only the bi-directional index and does not require access to base data or maintaining stored provenance data.

25 Claims, 14 Drawing Sheets

(56) References Cited

U.S. PATENT DOCUMENTS

| | | | |
|---|---|---|---|
| 7,315,872 B2* | 1/2008 | Narang et al. | 707/999.003 |
| 7,373,342 B2 | 5/2008 | Cragun et al. | |
| 7,792,836 B2* | 9/2010 | Taswell | 707/737 |
| 2003/0144995 A1* | 7/2003 | Franz et al. | 707/3 |
| 2006/0004717 A1* | 1/2006 | Ramarathnam et al. | 707/3 |
| 2006/0080369 A1* | 4/2006 | Razdow et al. | 707/204 |
| 2007/0271249 A1 | 11/2007 | Cragun et al. | |
| 2008/0027782 A1* | 1/2008 | Freire et al. | 705/9 |
| 2008/0040181 A1* | 2/2008 | Freire et al. | 705/8 |
| 2008/0126399 A1* | 5/2008 | MacGregor | 707/102 |
| 2008/0281915 A1* | 11/2008 | Elad et al. | 709/204 |
| 2008/0307104 A1* | 12/2008 | Amini et al. | 709/231 |
| 2010/0070463 A1* | 3/2010 | Zhao et al. | 707/608 |

OTHER PUBLICATIONS

Frew et al., "Automatic capture and reconstruction of computational provenance", Article first published online: Aug. 20, 2007. Concurrency and Computation: Practice and Experience 2007.*

Gadang et al., "Provenance tracking with bit vectors", In Proceedings of the Fourth International Conference on Information Assurance and Security (ISIAS2008), pp. 132-137, 2008.*

A. Golynski et al., "Rank/Select Operations on Large Alphabets: A Tool for Text Indexing," Procs. of the Seventeenth Annual ACM-SIAM Symposium on Discrete Algorithm, 2006, 6 pages.

D. Abadi et al., "Aurora: A Data Stream Management System," ACM SIGMOD International Conference on Management of Data, Jun. 2003, p. 666.

L. Amini et al., "SPC: A Distributed, Scalable Platform for Data Mining," ACM SIGKDD Workshop on Data Mining Standards, Services and Platforms, Aug. 2006, pp. 27-37.

D. Bhagwat et al., "An Annotation Management System for Relational Databases," The VLDB Journal, Nov. 2005, pp. 373-396, vol. 14, No. 4.

O. Biton et al., "Zoom*UserViews: Querying Relevant Provenance in Workflow Systems," VLDB, Sep. 2007, pp. 1366-1369.

M. Blount et al., "Century: Automated Aspects of Patient Care," IEEE, RTCSA, Aug. 2007, pp. 504-509.

M. Blount et al., "A Time-and-Value Centric Provenance Model and Architecture for Medical Event Streams," ACM HealthNet Workshop, Jun. 2007, pp. 95-100.

P. Buneman et al., "Provenance in Databases," ACM SIGMOD, Jun. 2007, pp. 1171-1173.

S.B. Davidson et al., "On Provenance and User Views in Scientific Workflows," DBIR2008, Keynote Speech, 2008 48 pages.

K. Hildrum et al., "Storage Optimization for Large-Scale Distributed Stream Processing Systems," ACM TOS, Feb. 2008, 8 pages, vol. 3, No. 4.

D.T. Liu et al., "GridDB: A Data-Centric Overlay for Scientific Grids," VLDB, 2004, pp. 600-611.

A. Misra et al., "Advances and Challenges for Scalable Provenance in Stream Processing Systems," IPLAW, Nov. 2008, 13 pages.

Wang-Chiew Tan, "Containment of Relational Queries with Annotation Propagation," DBPL, Sep. 2003, pp. 37-53.

Wang-Chiew Tan, Provenance in Databases: Past, Current, and Future, IEEE, 2007, pp. 3-12, vol. 30, No. 4.

Jennifer Widom, "Trio: A System for Integrated Management of Data, Accuracy, and Lineage," CIDR, 2005, pp. 262-276.

Dan E. Willard, "Log-Logarithmic Worst-Case Range Queries are Possible in Space Theta(N)," Information Processing Letters, Aug. 1983, pp. 81-84, vol. 17, No. 2.

* cited by examiner

*FIG. 1*

(a)
THE *BP* RELATION

| bpID | TM | SYSTOLIC | DIASTOLIC |
|---|---|---|---|
| 101 | 13:10 | 130 | 79 |
| 102 | 14:00 | 136 | 81 |
| 103 | 14:36 | 137 | 82 |
| 104 | 15:40 | 138 | 82 |
| 105 | 16:12 | 137 | 81 |
| 106 | 17:23 | 134 | 81 |
| 107 | 18:07 | 134 | 82 |
| 108 | 18:46 | 131 | 79 |
| 109 | 19:16 | 131 | 80 |
| 110 | 19:58 | 136 | 82 |
| 111 | 20:49 | 134 | 81 |
| 112 | 21:43 | 135 | 79 |
| 113 | 22:26 | 135 | 80 |
| 114 | 22:51 | 137 | 82 |
| 115 | 23:17 | 136 | 81 |
| 116 | 23:49 | 135 | 79 |

(b)
THE *BP*-ALERT RELATION

| alID | TM | ALERT |
|---|---|---|
| 201 | 16:00 | "PREHYPERTENSION" |
| 202 | 22:00 | "PREHYPERTENSION" |
| 203 | 00:00 | "PREHYPERTENSION" |

(c)
THE *BP2ALERT* RELATION

| bpID | alID |
|---|---|
| 102 | 201 |
| 103 | 201 |
| 111 | 202 |
| 114 | 203 |
| 115 | 203 |

FIG. 2

$Q^B$ : SELECT * FROM
   (SELECT * FROM
      (SELECT * FROM
         (SELECT * FROM BP WHERE $BP.tm \leq t$ AND $BP.tm \geq t - 180$) AS $T_1$
       ORDER BY $T_1.tm$ DESC FETCH FIRST 3 ROWS ONLY) AS $T_2$
    ORDER BY $T_2.tm$ ASC FETCH FIRST 2 ROWS ONLY) AS $T_3$
WHERE $T_3.systolic \geq 135$ $Q^F$ : SELECT * FROM
   (SELECT * FROM
      (SELECT * FROM BP-ALERT AL WHERE $AL.tm \geq t$ AND $AL.tm \leq t + 180$) AS $T_1$
    WHERE $T_1.tm \geq t$ AND $bp$ IN $Q^B$) AS $T_2$
WHERE $bp.systolic \geq 135$ AND $T_2.tm \geq t$ $Q^M$ : SELECT * FROM BP, BP2Alert WHERE $BP.seID = BP2Alert.bpID$ AND $BP2Alert.alID = (alert\_id)$

FIG. 3

(a) QUERIES FOR ALTERNATIVE 1

| | BACKWARD PROVENANCE | FORWARD PROVENANCE |
|---|---|---|
| TIME | SELECT*FROM *InputSE* IN<br>WHERE $IN.tm \leq (out.tm - t_b)$<br>AND $IN.tm \geq (out.tm - t_e)$ | SELECT*FROM *OutputSE* OUT<br>WHERE $OUT.tm \geq (in.tm - t_b)$<br>AND $OUT.tm \leq (in.tm - t_e)$ |
| SEQ. | SELECT*FROM<br>(SELECT*FROM *Input* SE IN<br>WHERE $IN.tm \leq out.tm$<br>ORDER BY $IN.tm$ DESC<br>FETCH FIRST $s_e$ ROWS ONLY) AS *Temp*<br>ORDER BY $Temp.tm$ ASC<br>FETCH FIRST $(s_e - s_b + 1)$ ROWS ONLY | SELECT*FROM *Output SE* OUT<br>WHERE $OUT.tm \geq in.tm$ AND<br>$in$ IN $q_S^B$(OUT) |
| VALUE | SELECT*FROM *InputSE* IN<br>WHERE $IN.tm \leq (out.tm$ AND<br>$IN.attr \geq v_b$ AND $IN.attr \leq v_e$ | SELECT*FROM *OutputSE* OUT<br>WHERE $in.attr \geq v_b$ AND<br>$in.attr \leq v_e$ AND $OUT.tm \geq in.tm$ |

(b) QUERIES FOR ALTERNATIVE 2

| | BACKWARD PROVENANCE | FORWARD PROVENANCE |
|---|---|---|
| ANY | SELECT SE.*FROM *ProvRel* PR, SE SE<br>WHERE $PR.out = out.time$ AND $PR.in = SE.id$ | SELECT SE.*FROM *ProvRel* PR, SE SE<br>WHERE $PR.out = in.time$ AND $PR.out = SE.id$ |

FIG. 6

(a) STEP 1

$$M = \begin{bmatrix} 1 & 1 & 1 & 0 & 0 \\ 0 & 0 & 1 & 1 & 0 \\ 0 & 1 & 0 & 0 & 1 \end{bmatrix}$$

(b) STEP 2

$V_C = (1, 2, 3, \quad 3, 4, \quad 2, 5, \quad )$ $V_R = (0, 0, 0, 1, 0, 0, 1, 0, 0, 1)$ (c) STEP 3

$$T = \begin{bmatrix} 1 & 0 & 0 & 0 & 0 & 0 & 0 & 0 & 0 \\ 0 & 1 & 0 & 0 & 0 & 1 & 0 & 0 & 0 \\ 0 & 0 & 1 & 1 & 0 & 0 & 1 & 0 & 0 \\ 0 & 0 & 0 & 0 & 0 & 0 & 0 & 0 & 1 \end{bmatrix}$$

$V_B = (1,0,1,0,1,0,1,1,0,0,1,0,1,0)$ (d) STEP 4

710 — Procedure ForwardProv(o)
1. $lblNum$ = object_nb(o);
2. for $i$ = 1 to $lblNum$ object_select(o, $i$);

720 — Procedure object_nb(o)
1. $bIdx$ = FindBlkIdx(o);
2. $bPos$ = FindBldPos(o);
3. $tmp1$ = rank-b($bIdx$) + rank$_{b,k}$($bIdx$, $bPos$);
4. $tmp2$ = rank-b($bIdx$ −1) + rank$_{b,k}$(($bIdx$ −1), $|V_C|$);
5. return ($tmp2$ − $tmp1$);

730 — Procedure object_select(o, $i$)
1. $bIdx$ = FindBlkIdx(o);
2. $bPos$ = FindBldPos(o);
3. $upto$ = rank-b($bIdx$) + rank$_{b,k}$($bIdx$, $bPos$);
4. $Idx$ = select-b($tmp1$ + $i$);
5. $tmp1$ = select$_{b,k}$($Idx$, $i$ − $upto$);
6. $tmp2$ = rank$_{V_R}$(0, $tmp1$);
7. return select$_{V_R}$(1, $tmp2$);

740 — Procedure rank-b($i$)
1. $tmp$ = select$_{V_B}$(0, $i$);
2. return rank$_{V_B}$(1, $tmp$);

750 — Procedure BackwardProv($l$)
1. $objNum$ = label_nb($l$);
2. for $i$ = 1 to $objNum$ label_select($l$, $i$);

760 — Procedure label_nb($l$)
1. $ridx$ = FindRowIdx($l$);
2. $fr$ = select$_{V_R}$(1, $ridx$ − 1);
3. $to$ = select$_{V_R}$(1, $ridx$);
4. return rank$_{V_R}$(0, $to$) − rank$_{V_R}$(0, $fr$);

770 — Procedure label_select($l$, $i$)
1. $ridx$ = FindRowIdx($l$);
2. $fr$ = select$_{V_R}$(1, $ridx$ − 1);
3. $tmp1$ = rank$_{V_R}$(0, $fr$);
4. return select$_{V_R}$(0, $tmp1$ + $i$);

780 — Procedure select-b($i$)
1. $tmp$ = select$_{V_B}$(1, $i$);
2. return rank$_{V_B}$(0, $tmp$);

FIG. 8

$$M = \begin{bmatrix} 1 & \boxed{1} & 1 & 0 & 0 & 0 \\ 0 & \boxed{0} & 1 & 1 & 0 & 1 & 0 \\ 0 & \boxed{1} & 0 & 0 & 0 & 0 & 1 \end{bmatrix}$$

$V_C = (1, 2, 3, \quad 3, 4, \quad \boxed{2}, 5 \quad )$
$V_R = (0, 0, 0, 1, 0, 0, 1, \boxed{0}, 0, 1)$ $$T = \begin{bmatrix} 1 & 0 & 0 & 0 & 0 & 0 & \boxed{0} & 0 & 0 \\ \boxed{0} & 1 & 0 & 0 & 0 & \boxed{1} & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 0 & 0 & 0 & 1 \end{bmatrix}$$

$$M = \begin{bmatrix} 1 & 1 & 1 & 0 & 0 & 0 \\ 0 & 0 & 1 & 1 & 0 & 1 & 0 \\ \boxed{0} & 1 & 0 & 0 & 0 & 0 & 1 \end{bmatrix}$$

$V_C = (1, 2, 3, \quad 3, 4, \quad 2, \boxed{5} \quad )$
$V_R = (0, 0, 0, 1, 0, 0, 0, 1, \boxed{0}, 0, 1)$

FIG. 11
1100

Procedure FindValue($v$)

1110 —
1. $anc$ = FindAncestor($v$);
2. if $v$ is a child of $anc$ then return 1
3. else return 0;

---

Procedure FindAncestor($v$)

1120 —
1. $d$ = $root$; $fromHt$ = $h$; $toHt$ = 0;
2. While ($fromHt$ != $toHt$)
3.     $midHt$ = ($fromHT$ + $toHt$)/2;
4.     $ancestID$ = $v/2^{fromHt}$
5.     $d$ = $Hash_{midHt}$
6.     if $d$ is NULL then $toHt$ = $midHt$
7.     else $fromHt$ = $midHt$;
8. return $d$;

---

Procedure InsertIndexValue($v$)

1130 —
1. $anc$ = FindAncestor($v$);
2. if the $(h_{anc-1})^{th}$ bit of $v$ is 0 then
3.     if $anc$ has no left child then AddChild($anc$, $v$, 0);
4.     else CreatePath($anc$, $anc.left$, $v$);
5. if the $(h_{anc-1})^{th}$ bit of $v$ is 1 then
6.     if $anc$ has no right child then AddChild($anc$, $v$, 1);
7.     else CreatePath($anc$, $anc.right$, $v$);

---

Procedure CreatePath($anc$, $child$, $v$)

1140 —
1. $i$ = $(h_{anc-1})^{th}$ bit of $v$;
2. While the $i^{th}$ bit of $child$ and $v$ are equal
3.     $d$ = CreateNewNode();
4.     AddChild($anc$, $d$, $i$);
5.     $anc$ = $d$;
6. AddChild($anc$, $v$, $i$);
7. AddChild($anc$, $child$, comp($i$));

FIG. 12

(a) INSERTING A NEW LABEL $l = 4$

$$M = \begin{bmatrix} 1 & 1 & 1 & 0 & 0 \\ 0 & 0 & 1 & 1 & 0 \\ 0 & 0 & 0 & 0 & 1 \end{bmatrix}$$

$V_R = (0, 0, 0, 1, 0, 0, 1, 0, 0, 1)$

(b) INSERTING A NEW LABEL $o = 6$

$$M = \begin{bmatrix} 1 & 1 & 1 & 0 & 0 & 0 \\ 0 & 0 & 1 & 1 & 0 & 0 \\ 0 & 0 & 0 & 0 & 1 & 0 \end{bmatrix}$$

(c) INSERTING A PAIR $(l, o) = (1, 4)$

$$M = \begin{bmatrix} 1 & 1 & 1 & 0 & 0 & 0 \\ 0 & 0 & 1 & 1 & 0 & 0 \\ 0 & 0 & 0 & 0 & 1 & 0 \end{bmatrix} \quad T = \begin{bmatrix} 1 & 1 & 0 \\ 1 & 0 & 0 \\ 0 & 0 & 1 \end{bmatrix}$$

$V_C = (1, 2, 3, 4, 3, 4, 2, 5)$
$V_R = (0, 0, 0, 0, 1, 0, 0, 0, 1)$
$V_{B_{old}} = (1, 0, 1, 0, 1, 0, 1, 1, 0, 0, 1, 0, 1, 0)$
$V_{B_{new}} = (1, 1, 0, 1, 0, 1, 0, 1, 0, 1, 0, 1, 0, 1, 0)$

FIG. 13

1310 —
```
Procedure UpdateCOLROW(l, o)

1.  ri_M = FindIndex(l);
2.  ci_M = FindIndex(o);
3.  fr = select_{V_R}(1, ri_M −1);
4.  to = select_{V_R}(1, ri_M);
5.  pos = select_{V_C[fr, to]}(col, 1);
6.  ShiftVector(V_C, pos);
7.  V_C[pos] = ci_M;
8.  ShiftVector(V_R, pos);
9.  V_R[pos] = 0;
```

1320 —
```
Procedure UpdateVectorB(V_B)

1.  shift = carry [] = idx = 0;
2.  for each block b of V_B
3.      MoveCarry(carry[]);
4.      base = bIdx X bSz;
5.      while NC[idx] < base
6.          shift = shift + 1; idx = idx + 1;
7.      carry[] = shift_trie_b(shift);
8.      while NC[idx] < (base + b S z)
9.          shift = shift + 1;
10.         carry[] = upd_trie_b(NC[idx] − base);
11.         idx = idx + 1;
12.     V_{B_new} = conv_trie_b();
13. return V_{B_new}
```

INDEXING PROVENANCE DATA AND EVALUATING PROVENANCE DATA QUERIES IN DATA PROCESSING SYSTEMS

FIELD OF THE INVENTION

Embodiments of the invention generally relate to information technology, and, more particularly, to indexing provenance data and evaluating provenance data queries in a data processing system.

BACKGROUND OF THE INVENTION

The concept of "provenance" generally refers to the source or sources of a given item. In terms of "data provenance," this generally refers to determining the source or sources of some given data. "Provenance data" is, therefore, data that is used to derive other data, or data that serves as a source of other data.

While data provenance has been used in decision support or data warehouse systems to uncover the interdependencies between data, minimal if any work has been done that considers provenance in the context of data streaming systems. Supporting data provenance in such systems creates some novel challenges as data volumes are orders of magnitude larger than in conventional systems and, therefore, the efficiency of provenance query evaluation quickly becomes an issue.

SUMMARY OF THE INVENTION

Principles and embodiments of the invention provide techniques for indexing provenance data and evaluating provenance data queries. While such principles are well adapted for data streaming systems, it is to be appreciated that they may also be applied to similar advantage in non-streaming systems.

For example, in one aspect, an exemplary method (which may be computer-implemented) for processing one or more queries directed toward data associated with a data processing system comprises the following steps. One or more data items of a first data set associated with the data processing system are mapped to a first representation type and one or more data items of a second data set associated with the data processing system are mapped to a second representation type. A bi-directional index of a data provenance relation existing between the data items of the first data set and the data items of the second data set is computed. The bi-directional index is computed in terms of the first representation type and the second representation type. A query evaluation is performed using the bi-directional index, in response to receipt of a provenance query. The bi-directional index is used for query evaluation whether the received provenance query is a backward provenance query or a forward provenance query. A response is generated for the received provenance query based on a result of the query evaluation.

In one or more embodiments of the invention, the provenance query evaluation step is performed by using only the bi-directional index and does not require access to base data or maintaining stored provenance data. Further, in one or more embodiments of the invention, the first representation type comprises labels and the second representation type comprises objects.

Furthermore, one or more embodiments of the invention or elements thereof can be implemented in the form of a computer product including a tangible computer readable storage medium with computer usable program code for performing the method steps indicated. Still further, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features, and advantages of the present invention will become apparent from the following detailed description of illustrative embodiments thereof, which is to be read in connection with the accompanying drawings.

BRIEF DESCRIPTION OF THE DRAWINGS

FIG. 1 shows examples of blood pressure readings and alerts for use in understanding one or more embodiments of the invention.

FIG. 2 shows provenance queries for use in understanding one or more embodiments of the invention.

FIG. 3 shows time-and-value centric provenance queries for use in understanding one or more embodiments of the invention.

FIG. 6 shows basic index constructs according to one or more embodiments of the invention.

FIG. 7 shows provenance query algorithms according to one or more embodiments of the invention.

FIG. 8 shows index use in forward provenance according to one or more embodiments of the invention.

FIG. 9 shows index use in backward provenance according to one or more embodiments of the invention.

FIG. 11 shows compressed X-fast trie algorithms according to one or more embodiments of the invention.

FIG. 12 shows index parts affected by updates according to one or more embodiments of the invention.

FIG. 13 shows index update algorithms according to one or more embodiments of the invention.

DETAILED DESCRIPTION OF PREFERRED EMBODIMENTS

Figure 4:
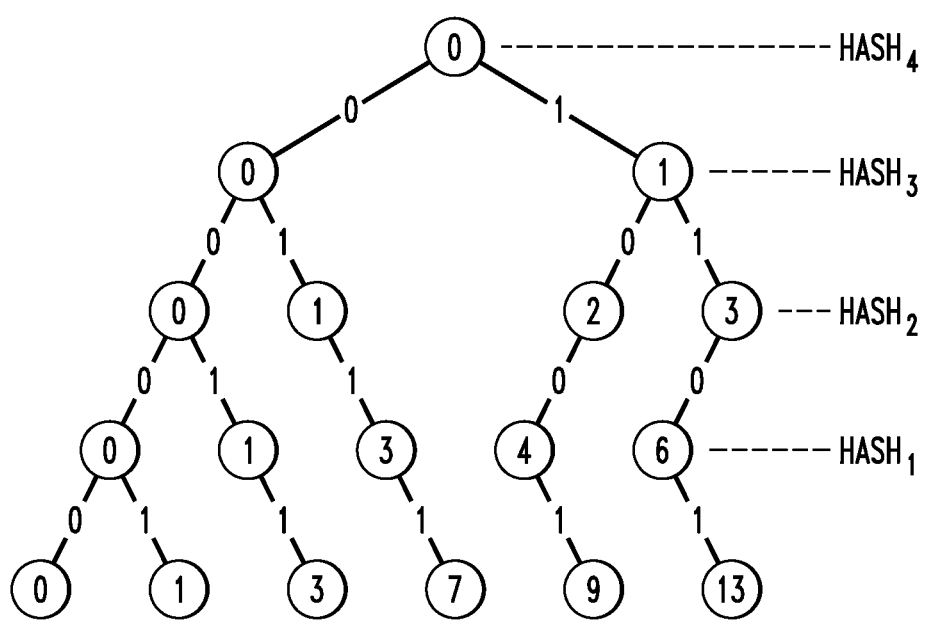
FIG. 4 shows an X-fast trie example for use in understanding one or more embodiments of the invention.

While illustrative embodiment of the invention will be described below in the context of a data processing system that processes streaming data, it is to be understood that data provenance principles of the invention may be applied to data processing systems that process non-streaming data.

It is realized that there are two approaches to answering a query directed to provenance data, also known as a provenance query. The first approach involves the evaluation of complex provenance queries over the underlying data (queries that encode the provenance relationships between the data). The second approach involves the materialization of provenance relationships between the data. It is further realized that a trade-off between time and space exists between the two approaches. While the first approach is space efficient given that no materialization occurs, it is less efficient in terms of query evaluation time (due to query complexity). The second approach also involves the construction of pairs of indexes to answer backward/forward queries. It is realized that when using conventional indexes, performance degrades as the size of the indexed data increases.

Thus, as will be described in detail below in the context of illustrative embodiments, principles of the invention introduce an index structure to support efficient evaluation of provenance queries in streaming environments (which can also be applied to non-streaming environments). Advantageously, the index possesses properties of duality and locality. Due to duality, the single index can answer both backward provenance queries (indicating which input stream items generate a specific output item) and forward provenance queries (indicating the generation of which output items does an input item influence). Index locality guarantees that in spite of the huge volumes of streaming data, query evaluation time depends mainly on the size of the query results and is largely independent of the total size of indexed data. Additional optimizations are introduced that further reduce provenance query evaluation times. That is, as will be described below, the index can be incrementally maintained. Further, illustrative embodiments of the invention describe a provenance-aware decomposition into sub-indexes that improves both memory consumption and central processing unit (CPU) utilization.

Prior to describing various illustrative principles of the invention, some illustrative application environments in which such principles can be applied are described, as well as an example of a provenance model with which illustrative principles of the invention may be employed. However, it is to be understood that the invention is not limited to either the illustrative application environments or the illustrative provenance model described below. The description of these environments and models are merely made to facilitate an understanding of principles of the invention.

By way of example only, it is realized that healthcare and finance domains are prominent adopters of data streaming technology. In a healthcare environment, for example, it is realized that data streams may include remote sensor-based medical streams for large numbers of patients that are then processed by healthcare online analytics. It is also realized that there may be a requirement to persist such streams. Stream persistence is in stark contrast with traditional streaming settings where streaming data is discarded after being operated on. However, healthcare regulations may require that a patients' (streaming) data is persisted for a minimum of 5 years (for adults) and as much as 18 years (for adolescents). Similarly, in the finance domain, persistence is paramount since an auditor must be able to retrieve all the streaming data (e.g., stock ticker) relating to a financial transaction.

Persisting such huge volumes of data may be a challenge in its own right. Yet, for the users of such data, the biggest challenge may come after the data is persisted. Provenance queries are used to uncover complex data interdependencies, but given the huge volumes of data, the efficiency of these queries quickly becomes an issue. In response to such realization, principles of the invention provide approaches for the efficient evaluation of provenance queries in streaming settings. However, such inventive solutions are generic and directly applicable to non-streaming provenance-enabled systems such as, but not limited to, Trio, GridDB and Zoom. More generally, the inventive solutions address the open problem of efficiently storing and quering provenance data (in streaming environments or otherwise).

To illustrate the main issues, FIGS. 1(a) and 1(b) show sample relations used to persist streams of blood-pressure readings and pre-hypertension alerts. Using the blood-pressure readings stream as input, assume that analytics generate a pre-hypertension alert stream as follows: With 4 readings in every 3-hour epoch (readings and alerts in the same epoch are shaded alike), an alert is generated at the end of an epoch when any of the readings in the middle of an epoch (the $2^{nd}$ and $3^{rd}$ reading) has a systolic pressure larger than 135 mmHg. Intuitively, assuming medication is given to a patient at the beginning of each 3-hour epoch, it is checked whether the medication has any effects to the patient's blood pressure (such effects are mainly visible in the middle of the epoch, where medication is mostly active).

Given a pre-hypertension alert, a clinician must be able to issue a provenance query to retrieve the blood-pressure readings that resulted in the alert. This is referred to as a backward provenance query which, given an output data item (e.g., medical alert) of some processing, the query retrieves all the inputs that contributed to its generation. However, forward provenance queries are equally important here. Given an abnormal blood-pressure reading, a clinician must be able to check whether the reading has generated any alerts. Conventional (forward/backward) provenance queries are often answered using data annotations, where each data item is annotated with the identifiers of items that are relevant to it. However, it is easy to see that annotation-based approaches very quickly result in huge amounts of additional annotation data that need to be stored to answer provenance queries (even more so in a streaming environment). Since conventional annotation-based methods are inadequate, principles of the invention propose an index to support evaluation of provenance queries. The index structure need not store any annotation data, thus reducing space overhead, and it provides for an efficient evaluation of queries.

Throughout the illustrative description, an extension of a provenance model referred to as a TVC (time-and-value centric) provenance model is assumed. However, the inventive solutions are applicable to other streaming and non-streaming provenance models (with or without stream persistence). Key concepts in TVC are the Processing Element (PE), the Stream Element (SE), and the Provenance Rule (PR). Intuitively, each data stream is a stream of SEs (with each SE represented by a persisted tuple). Each PE is a user-provided program (written in C/C++ or Java) that accepts as input one or more streams of SEs. The PE processes its input SEs according to its internal logic and, in turn, generates as its output a stream of output SEs.

For example, in accordance with the FIG. 1 example, a PE accepts as input a stream of blood-pressure readings and generates pre-hypertension alerts. The output of a PE can be used as an input to another PE, creating an arbitrary complex workflow of PEs, and SEs flowing between these PEs. Given an output SE of a PE, the logic of which input SEs generated this output SE is internal and hidden in the program of the PE. However, this logic is important for (both backward and forward) provenance. Therefore, the TVC model provides a declarative, PE-implementation independent, language to express a provenance rule PR that captures the internal logic of the PE. As an example, consider the logic of the PE that reads blood-pressure readings and generates pre-hypertension alerts. The following rule captures this logic illustrating the expressiveness of the model (note that below a detailed description of the TVC model and its rule syntax is provided):

$$PO_0(t):-PI_1 \langle (T,(t,t-180,180),1)(S,(2,3,-),2)(V,bp, (135,-,-),3) \rangle \quad (1)$$

Given as input (a) an alert from the BP-Alert relation; and (b) the PR rule, it is desired to determine the tuples in the BP relation that contributed to the alert (backward provenance). There are two alternatives to satisfy this request, both of which require that rule PR be translated into the SQL query $Q^B$ in FIG. 2 over the BP relation (below, the format of these queries is explained). Briefly, the innermost sub-query in $Q^B$ selects the readings within an epoch. Then, the $2^{nd}$ and $3^{rd}$ reading are checked for a systolic value larger than 135 mmHg. For the alert on time 16:00, query $Q^B$ returns the readings with seID=102 and seID=103. Although the reading with seID=104 also has a systolic value larger than 135, it is not selected since it's the $4^{th}$ reading in the epoch. Similarly, the reading with seID=105 does not generate an alert since it's only the $1^{st}$ reading in the epoch.

As a first alternative to support backward provenance, query $Q^B$ is evaluated each time a clinician requests the provenance of an alert. As a second alternative, query $Q^B$ is executed once for each alert, and its results are materialized. FIG. 1(c) shows such a materialization. Any subsequent backward provenance query accesses the materialized relation, using the query $Q^M$ in FIG. 2, to retrieve blood-pressure readings. A trade-off between time and space is apparent. While the former alternative is space-efficient since no materialization occurs, it is less efficient in terms of query evaluation time (due to query complexity). Materialization also facilitates forward provenance queries since without it, an even more complex query $Q^F$ (shown in FIG. 2) must be evaluated (which encapsulates query $Q^B$). Given the time/space tradeoff, illustrative embodiments of the invention provide efficient evaluation of (forward and backward) provenance queries without materialization of results, as will be described in detail below.

The TVC provenance model is now described in further detail. Assume that it is desired to retrieve all the input SEs that generated an output SE (e.g., a medical alert) of some PE. In a conventional annotation-based provenance model, such a provenance query is trivially answered since each output SE is annotated with a potentially large set of identifiers, one for each input SE that led to the generation of the output SE. However, the price paid for this simplicity is that annotation-based models introduce huge storage overhead.

The TVC provenance model addresses this shortcoming through a set of primitives that declaratively specify the nature of the causative relationship between the output and input SEs of a PE. In sum, TVC relies on the fact that the input-output dependencies for most PEs can be specified in terms of some invariants-while each output SE may have a variable set of causative input SEs, this set may be indirectly determined through the application of these invariant primitives. The following primitives are supported:

Time: This primitive is used when an output SE of a PE depends on a past time window of input SEs. The primitive format is $PI_i \langle (T,(t-t_b,t-t_e,sf), or) \rangle$, where i specifies the input stream identifier (a PE can have multiple input streams), $(t-t_b)$ and $(t-t_e)$ the time window enclosing the input SEs, sf the shift of the input time window between consecutive outputs, and or the primitive order, when multiple primitives for the same input stream i are given (more on this later). To illustrate, rule $PO_0(t):-PI_1 \langle (T,(t-10,t-60,40),1) \rangle$ indicates that an output SE at time t is generated by input SEs between times (t-10) and (t-60). As the input window shifts by 40 time units between two consecutive output SEs, the input SEs between (t-10) to (t-20) are used for both outputs.

Sequence: The primitive expresses dependencies in terms of sequences of input SEs. The primitive format is $PI_i \langle (S,(s_b, s_e,sf),or) \rangle$, where i specifies the input stream identifier, $s_b$ and $s_e$ the start and end sequence numbers of the input SEs used, sf the shift of the sequence window between consecutive outputs, and or the primitive order. For example, rule $PO_0(t):-PI_1 \langle (S,(5,20,10),1) \rangle$ indicates that an output SE at time t depends on all the SEs between the $5^{th}$ and the $20^{th}$ input SE. Here, the sequence window is shifted by 5 SEs between consecutive outputs.

Value: The primitive expresses dependencies in terms of predicates over the attributes of the input SEs and its format is $PI_i \langle (V,attr,(v_b,v_e,sf),or) \rangle$, where $v_b$ and $v_e$ specify the range of values the attribute attr of input SEs must satisfy, sf the shift of the input value window, and or the primitive order. For example, rule $PO_0(t):-PI_1 \langle (V,hr(85,100,10),1) \rangle$ indicates that an output SE at time t depends on heart rate SEs with values between 85 and 100. Between consecutive outputs the ten oldest heart rate readings are dropped from consideration.

Of course, a different primitive can be used for each of the inputs streams of a PE. For example, rule $PO_0(t)-PI_1 \langle (T,(t, t-180,90),1) \rangle$, $PI_2 \langle (S,(1,10,10),1) \rangle$ specifies that a time dependency holds between an output SE and input SEs from the first input stream, while for the same output SE a sequence dependency holds for the second input stream. For significantly enhanced expressiveness, a combination of (time, sequence, value) triples, for each of the input streams, can be specified. The unique 'order' field defines an evaluation order for these primitives, with the output sub-stream of a lower order primitive acting as the input stream for a higher order primitive. As an example, the rule mentioned above (rule (1)) considers a single input stream and applies all three primitives in the indicated order.

As mentioned, there are two alternatives to support provenance queries in the TVC model. The first alternative translates each TVC rule to an SQL query over the persisted streams. FIG. 3(a) shows the SQL queries that must be evaluated over the persisted streams, for each of the primitives that appear in the rule, to answer backward and forward provenance queries. If the TVC rule involves more than one primitives for the same input stream, as is the case for the TVC rule mentioned above (rule (1)), the SQL queries of all the mentioned primitives need to be composed (see FIG. 2 for an example).

The second alternative also persists the input/output SE dependencies (as defined by the TVC rule of a PE and by the equivalent SQL query), and uses the persisted relation to answer the provenance queries. Here, a simple pair of queries suffices to evaluate forward/backward provenance queries, as shown in FIG. 3(b). Notice that when SE dependencies are persisted, the provenance queries are independent of the TVC rule primitives used to generate them.

I. Index Structure

To avoid the evaluation of complex provenance queries (alternative 1 above) or the materialization of their results (alternative 2 above), principles of the invention provide an index to support efficient evaluation of provenance queries.

Such an index structure according to an illustrative embodiment of the invention will now be described.

A. Basic Concepts i. Objects and Labels: The index uses the abstract concepts of objects and labels. Intuitively, given a PE, objects correspond to the input SEs of the PE, while labels correspond to output SEs. Use of the notion of objects/labels, instead of input/output SEs, has several advantages. For example, as will be described below, it is possible to reverse the mapping of objects/labels to input/output SEs. That is, objects can be mapped to output SEs and labels to input SEs. Indeed, this reversal has important implications, which will be described below.

ii. Rank and Select: The rank and select operations are important to the inventive index approach and are both defined over vectors of symbols. Formally, consider a symbol s in an alphabet S and a vector V of symbols from S. For a position i of V, rank (s, i) returns the number of occurrences of s before this position. For a symbol s∈S and a number i, select (s, i) returns the position of the $i^{th}$ occurrence of s in V.

iii. X-fast trie: Consider a set N of integer values that are to be indexed. An X-fast trie is a binary trie where all the indexed values are stored as leaves. For a non-leaf node d at height h of the trie, all leaves that are descendants of d, denoted as Desc(d), have values between $i \times 2^h$ and $(i \times 2^h)-1$, for some integer i, called the identifier of d. FIG. 4 shows an example of an X-fast trie where each node is marked with its identifier, with internal nodes being marked with no shading, while leaf nodes are marked with shading. Assume now that while searching for a value v in the trie, node d is reached. Then, in a typical trie structure, as a next step, the $h^{th}$ bit of v is checked and if this bit is 0, then go to the left child of d, else go to the right child. The process iterates in this fashion until either the process cannot proceed, which implies that v is not in the set of indexed values, or the leaf containing v is reached.

To illustrate, assume a search for value v=12 (whose binary representation is 1100). Then, starting from the root, go right (node 1 at level 3), then right again (node 3 at level 2), then left reaching node 6 at level 1. Since the node has no left child, the search is concluded and thus node 12 is not in the trie. It is easy to see that, for typical tries, this process requires O(log|N|) time. Unlike typical tries, in X-fast trie, searches are faster and only take O(loglog|N|) time. Two main characteristic of the X-fast trie result in this improvement. First, a different hash function is used at each height of the tree to index the nodes at that height. Second, while searching for a value v in the X-fast trie, instead of going down the trie one level at a time, as explained above, in an X-fast trie, a binary search is performed over the height of the tree.

In more detail, starting from a trie of height h, jump to height h/2 and use the hash function $Hash_{h/2}$ and hash $v/2^{h/2}$, which is the identifier of the ancestor v of at height h/2. If the hash function retrieves no such node, then the binary search iterates by only looking for ancestors at heights between h and h/2. If an ancestor is found at height h/2, again the search iterates, but this times it looks for ancestors at heights between h/2 and 1. At the end of the binary search, either retrieve the ancestor of v at level 1 and then check in O(1) for the existence of node v, or a non-leaf node higher up the tree has been reached, in which case it is said that v is not in the indexed set. To illustrate, assume a search again for value v=12, starting from the root at height h=4. Initially, hash function $Hash_2$ at level 2 returns the ancestor node $(12/(2^{(4/2)}))=3$ of v at this level. Then, continuing at level 1, look for ancestor node $(12/(2^1))=6$. The binary search terminates at this point, and since node 6 has no left child, node v=12 in not indexed by the trie.

Using the notions of labels and objects, the operations of rank and select, and X-fast tries, in the next section a basic index construction methodology is presented. Then, it is shown how to use the index to answer forward/backward provenance queries in data streams.

B. Index Construction

Figure 5:
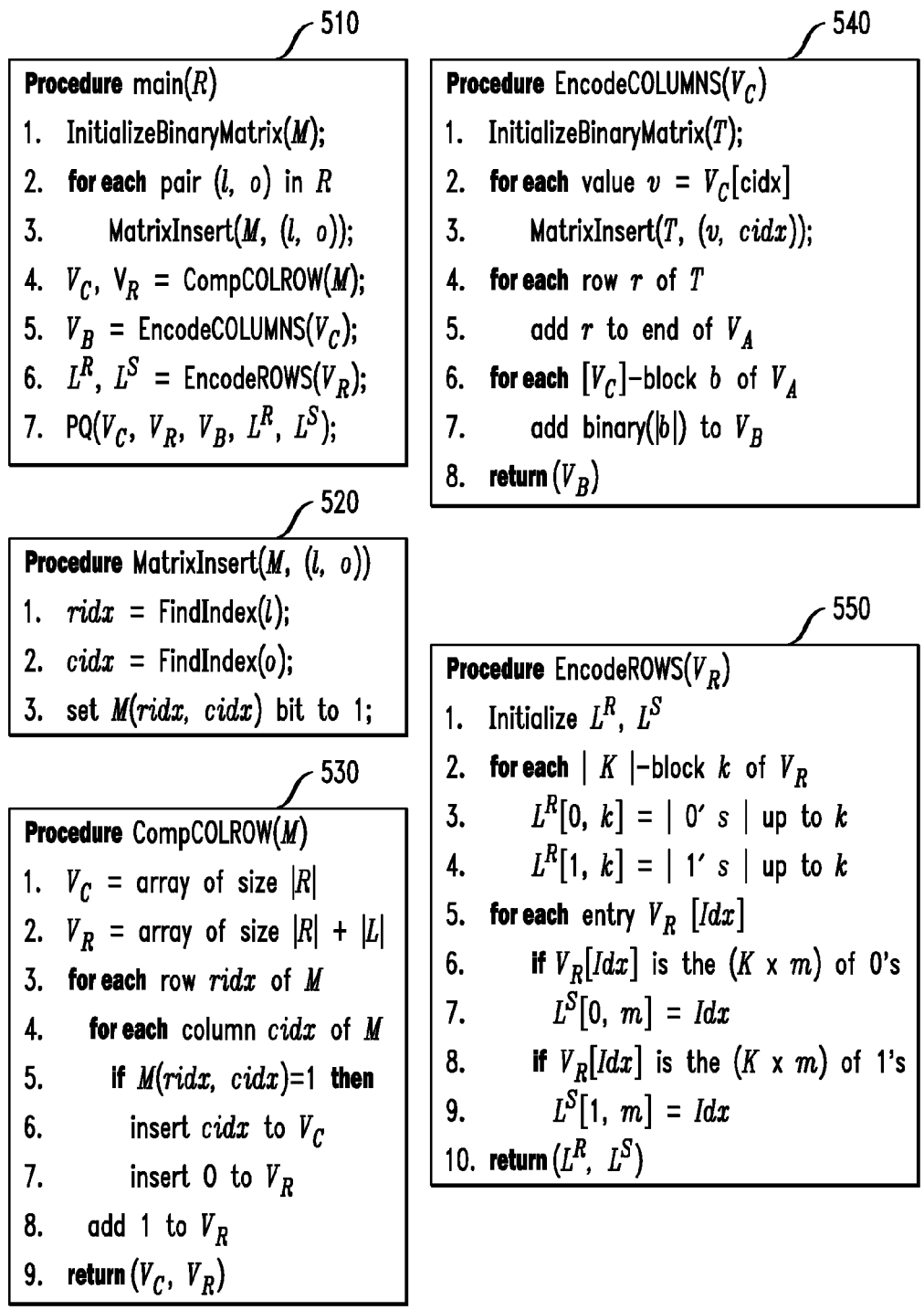
FIG. 5 shows a basic index construction algorithm according to one or more embodiments of the invention.

In order to better illustrate the index construction methodology, its main points are presented through a running example. A pseudo-code algorithm 500 of the methodology is shown in FIG. 5. The input to the algorithm is a binary relation R between a set of objects O and a set of labels L. The algorithm has four main steps.

i. Step 1: As a first step, a binary matrix M is created, with rows representing labels, columns representing objects, and the entry M[i, j] is set to 1, if the label of row i is associated with the object of column j in relation R (lines 1-3 in Procedure main 510 including Procedure MatrixInsert 520 in FIG. 5). FIG. 6(a) shows an example of a matrix M with 3 labels (rows) and 5 objects (columns).

ii. Step 2: As the next step, Procedure CompCOLROW 530 is invoked to compute two new vectors, namely, vectors $V_C$ and $V_R$, in the following manner. Vector $V_C$ contains as many entries as the number of 1's in M (notice that this is equal to |R|), while vector $V_R$ contains R+L entries. In the running example, the former vector has 7 entries, while the latter has 10. To populate the vectors, matrix M is traversed in row-major order. If the $j^{th}$ column in the $i^{th}$ row has value 1, then (a) add j to $V_C$; and (b) add a zero to $V_R$. Furthermore, at the end of each row of M, add a one to $V_R$. FIG. 6(b) shows the two vectors for the running example.

iii. Step 3: This step considers Procedure EncodeCOLUMNS 540 and uses vector $V_C$ to generate three new constructs. The first construct is another binary matrix T with as many columns as the size of vector $V_C$, and as many rows as the number of distinct values in $V_C$. In our example, T is a 5×7 matrix. Entry T[i, j] is 1 if the $j^{th}$ entry in $V_C$ has the value corresponding to the $i^{th}$ row. Matrix T is used to construct two additional vectors, namely $V_A$ and $V_B$. The former vector results in a row-major traversal of matrix T (not shown). The latter vector is generated by a two-step procedure in which (a) $V_A$ is split in blocks of a size equal to the number of rows of T; and (b) for each block, its cardinality of 1's is written in unary and a zero is added after that. Only vector $V_B$ is used in the remaining computation and thus $V_A$ can be discarded. FIG. 6(c) shows matrix T and vector $V_B$ for the running example.

iv. Step 4: For the last step, Procedure EncodeROWS 550 uses vector $V_R$ to generate four constructs. Specifically, for a parameter K, $V_R$ is split in blocks of size K. Then, $L^R[0,k](L^R[1,k])$ stores the number of 0's (respectively, 1's) up to the $k^{th}$ block. Furthermore, $L^S[0,m](L^S[1,m])$ stores the index of the position in $V_R$ of the $(K \times m)^{th}$ 0 (respectively, 1). FIG. 6(d) shows the values of these constructs for K=2.

It is important to note that matrices M and T are typically not constructed and are not part of the index since they are very expensive to create/maintain, due to their large size. Still, for illustration purposes, the matrices are presented alongside the other constructs. The computed vectors, which effectively contain the compressed information found in the matrices, are the only constructs used during query evaluation. Structures such as hash functions and X-fast tries are built on top of these vectors to speed-up possible searches over them.

Further, the above process is an example of mapping data items of a first data set associated with the data processing system to a first representation type and data items of a second data set associated with the data processing system to a second representation type, and computing a bidirectional index of a data provenance relation existing between the data items of the first data set and the data items of the second data set, wherein the bi-directional index is computed in terms of the first representation type and the second representation type.

C. Answering Provenance Queries

As in the previous section, a running example is used to illustrate main steps of provenance evaluation algorithms, whose pseudo-code 700 is shown in FIG. 7.

i. Forward provenance: A forward provenance query accepts as input an object o and returns as output the set of labels associated with it. As an example, consider object o=2 from FIG. 6, and assume that it is desired to retrieve all the labels associated with it. The forward provenance evaluation algorithm 710 has two main steps. In the first step, the algorithm uses Procedure object_nb 720 to retrieve from the index the number of labels associated with the input object. In the second step, a simple loop calls Procedure object_select 730 to retrieve the $i^{th}$ label, in each iteration.

Intuitively, for an object o corresponding to the $j^{th}$ column in matrix M, a label l is in the answer of the query for o, if M[i,j]=1, where i is the row of label l. FIG. 8 shows the relevant column (and labels) for the case of o=2. The objective is to use the rank and select primitives over the constructs of the previous section to locate all these labels efficiently (remember that matrices M and T are not created/accessed, due to their large size, but only shown here for illustration purposes). Specifically, Procedure object_nb 720 (with Procedure rank-b(i) 740) uses the rank primitives defined over the $V_C$ and $V_B$ vectors to compute the number of labels associated to the input object o. Notice that this number is essentially the number of 1's in the highlighted (shaded) row of matrix T and is computed without accessing T. In sum, rank computes the number of 1's that one would find in the first two rows of T (line 3 in object_nb 720) and from that number subtracts the number of 1's found in the first row (line 4 in object_nb 720). X-fast tries play an important role here (but also in other parts of the implementation) since they are at the core of the implementation of $rank_{bk}$ function.

In terms of Procedure object_select 730, assume that what is being looked for is the second label associated with object o=2, i.e., label l=3. The procedure first determines (in lines 3-5) the index pos of the entry in $V_C$ that contains the second occurrence of value o=2. In the running example, pos=6 as highlighted in the figure. Notice that if M is traversed in row-major order, the $pos^{th}$ 1 is located in M[3, 2], which is the answer to the query since it establishes that the second label for object o=2 is label l=3. Since matrix M is not available, to get the answer the position of the $pos^{th}$0 in $V_R$ is found (line 6). In this case, this is position 8 of $V_R$ (also highlighted in the figure). Then, by counting the number of 1's in $V_R$ (line 7), which correspond to the number of rows in M before that position, it is determined that position 8 is in the third row of M and, therefore, the label with l=3 is the answer to the query.

ii. Backward provenance: A backward provenance query accepts as input a label l and returns as output the set of objects associated with it. To illustrate, assume that it is desired to retrieve all the objects associated with label l=3 (see FIG. 6). Similar to forward provenance, backward provenance evaluation 750 involves two steps. In the first step, Procedure label_nb 760 retrieves the number of objects associated the label l. In the second step, a loop calls Procedure label_select 770, retrieving the $i^{th}$ object in the corresponding iteration.

Procedure label_nb 760 (with Procedure select-b(i) 780) relies solely on $V_R$ to compute the number of objects of label l. Since label l corresponds to the $l^{th}$ row of M, the number of objects associated with l is equal to the number of 1's in this row. For the example in FIG. 9, for l=3 this is equal to 2. In turn, this number is equal to the number of 0's between the $(l-1)^{th}$ and $l^{th}$ 1 in vector $V_R$. Two calls of $select_{V_R}$ determine the positions of the $(l-1)^{th}$ and $l^{th}$ 1 in $V_R$, while two calls in $rank_{V_R}$ count the number of 0's up to those positions. Procedure label_nb 760 returns the difference between the latter numbers, which in this case is equal to two.

Hereafter, assume that the interest is on i=2, i.e., retrieving the second object associated with l=3. Procedure label_select 770 also relies on $V_R$. To retrieve the $i^{th}$ object associated with l, $select_{V_R}$ (line 2) is used to find the position in $V_R$ after which all the 0's for the line corresponding to l are stored. In the example, this is position 7. A call in $rank_{V_R}$ (line 3) returns the number tmp1 of 0's before that position, five in the example. Then, a second call to $select_{V_R}$ returns the position of the $(tmp1+i)^{th}$ zero, i.e., position 9. Given this position, the methodology can now go to $V_C$ and determine that entry (9−(l−1)=7) of $V_C$ holds the identifier of the second object, here o=5.

The forward and backward provenance query evaluation (as described above) terminates in both cases at this point, if the provenance query only requires the identifiers of labels/objects to be returned. This is known as an index-only query evaluation. If, however, other fields of the records must be part of the result, the identifiers retrieved by the index are used to retrieve those fields from the base relations.

Further, the above process is an example of performing a query evaluation using the bi-directional index, in response to receipt of a provenance query, wherein the bi-directional index is used for query evaluation whether the received provenance query is a backward provenance query or a forward provenance query.

II. Optimizing Index Performance

In the following section, three orthogonal optimizations of the basic index structure (described in the above sections and subsections) are presented.

The first optimization (described in subsection A. below) focuses on X-fast tries. In spite of its efficiency, the basic X-fast trie structure contains a lot of redundant nodes. Starting with this observation, the basic structure is optimized by improving both its memory consumption and its run-time performance. In turn, the performance of our forward and backward provenance queries is improved.

It is realized that the set of objects O, labels L, and the binary relation R between them is known a priori, before the index is built. Notice that in Procedure main 510 of FIG. 5, the index is first built, and then provenance queries are processed. It is realized that, in a streaming environment, it may be advantageous to build and maintain the index incrementally, as new inputs arrive and new outputs are produced. The second optimization (described in subsection B. below) addresses this issue.

Finally, it is realized that, in a streaming environment, it may not always be possible to expert to build a single index structure to be used throughout the lifetime of the data processing system. Irrespectively of how efficient this structure is, the volume of indexed streaming data may soon render the structure unusable, as its size increases along with the indexed data. As a result, the third optimization (described in subsection C. below) proposed here a decomposition of the single index into a number of smaller cooperating index structures.

A. Optimizing X-Fast Tries

Figure 10:
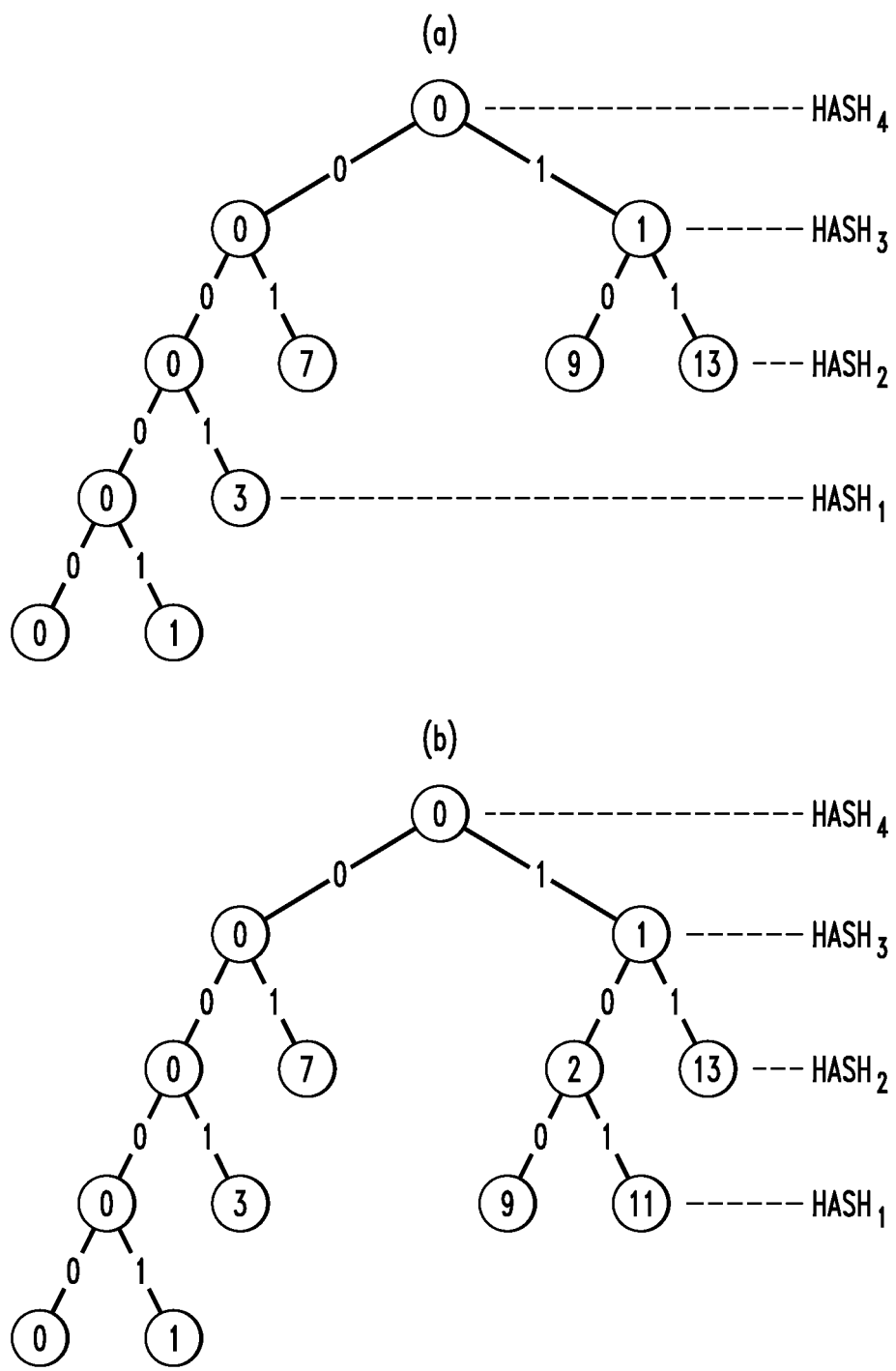
FIG. 10 shows insertion in compressed X-fast trie according to one or more embodiments of the invention.

Consider the X-fast trie in FIG. 4. By construction, a path must exist from the root of the trie to any indexed value v, even if the internal path nodes are used solely for indexing v (for each such node d, Desc(d)={v}). For example, in the trie of FIG. 4, three internal nodes are used solely to connect the trie root with the leaf holding value 13. Similarly, two internal nodes are used solely to connect node 0 at level 3 with the leaf node holding value 7. Starting from this simple observation, an optimization is proposed to compress the trie by removing wasteful internal nodes for which |Desc(d)|=1. The trie in FIG. 10(a) results by compressing the trie of FIG. 4.

FIG. 11 illustrates the compressed X-fast trie algorithms 1100.

In sum, two procedures are changed in the X-fast trie implementation to support compression. The first is Procedure InsertIndexValue 1130, which inserts new values into the trie, and thus is responsible for creating its (compressed) structure. The second is Procedure FindValue 1110, which searches for an indexed value, and thus must account for the fact that indexed values can now appear in all levels of the trie (and not just on level 0). The procedures and the changes in each of these procedures are now described.

The process starts with Procedure FindValue 1110 which determines whether, or not, value v is in the trie based on the return value of Procedure FindAncestor 1120. The latter procedure performs a binary search over the height of the trie, looking for the ancestor anc of v at the lowest height h. Given node anc, Procedure FindValue 1110 checks whether v is indeed a child of anc. For example, consider searching for value v=3 in the trie in FIG. 10(a). Procedure FindAncestor 1120 returns as anc node 0 at level 1, and FindValue 1110 returns 1, since indeed the node holding value 3 is a child of anc. On the other hand, while searching for value v=2, FindAncestor 1120 returns the same anc node, however FindValue 1110 returns 0, now.

Procedure InsertIndexValue 1130 starts by also calling FindAncestor 1120 to determine the node anc where value v is to be inserted. In the simplest scenario, v is to be inserted as a left (right) child of anc, and anc has no left (respectively, right) child. Then v is inserted as that child of anc. However, if anc already has a child in that position, then the tree needs to be expanded. Procedure CreatePath 1140 creates as many internal nodes in the trie as the number of common bits between v and the child of anc, starting from the $(h_{anc}-1)^{th}$ bit. The loop terminates when it finds a bit in which the left (right) child of anc differs from v. Then, the child of anc and v become children of the internal node that was created last. To illustrate, consider the trie in FIG. 10(a), while in FIG. 10(b) the trie after the insertion of value v=11 is shown. Here, FindAncestor 1120 returns as anc node 1 at level 3. Value v=11 is to be inserted to the left of anc but the node storing value v'=9 is stored there. Therefore, CreatePath 1140 creates a new internal node 2 at level 2, since both v and v' agree up to their second most significant bit. Values v and v' then become children of this new node.

B. Incremental Index Update

Consider three update types, namely, inserting a new label l, a new object o, or a new relationship (l, o) between a label and object. Streaming data is only inserted into the index and, hence deletions are not considered.

i. Inserting a label: Intuitively, inserting a label l to the index amounts to adding a new row to matrix M (see FIG. 12(a) where a row is inserted in the running example of FIG. 6). Since the inserted row contains only 0's, vector $V_C$ is unaffected and therefore so is matrix T and vector $V_B$. However, the addition of the new row requires adding an extra one at the end of vector $V_C$. This necessitates calling Procedure EncodeROWS (550 of FIG. 5) which however needs only to consider the update of the last entries in vectors $L^R[1]$ and $L^S[1]$.

ii. Inserting an object: Intuitively, inserting an object o amounts to adding a column to matrix M (see FIG. 12(b)), which affects neither $V_C$, nor $V_R$ (or any of the other constructs for that matter). This is particularly important, especially if it is considered that, in the illustrative setting, objects are mapped to incoming SEs. As long as these SEs do not contribute to the generation of an output SE, the index is unaffected.

iii. Inserting a relationship: FIG. 12(c) shows the results of inserting a new relationship (l, o)=(1, 4) to the example of FIG. 6. Notice that all the index constructs are affected. However, the effects of the insertion are more localized for vectors $V_C$ and $V_R$. In more detail, Procedure UpdateCOLROW (shown as 1310 in FIG. 13) locates the part of $V_C$ corresponding to the row of label l (lines 1-4). Then, it uses an X-fast trie on the part to locate the entry pos that object o must be inserted (line 5). Finally, both vectors $V_C$ and $V_R$ are shifted to make space for the new entry. Value o is inserted in $V_c$, while a 0 is inserted in $V_R$ (see FIG. 12(c)).

The situation is more complicated for vector $V_B$ since, as the figure shows, vector $V_{B_{new}}$ after the insertion is radically different from vector $V_{B_{old}}$ before it. Therefore, one might be tempted to execute Procedure EncodeCOLUMNS (540 of FIG. 5) to re-generate the vector. However, this may not be the best solution since, apart from the vector, a considerable number of internal structures (including X-fast tries) needs to be re-computed.

As an alternative, principles of the invention provide an algorithm (Procedure UpdateVectorB 1320 in FIG. 13) which updates incrementally the existing structures and converts the old vector into the new one. More importantly, the procedure uses a single pass algorithm over the underlying structure.

In more detail, vector $V_B$ is processed one block b at time, where a block is a series of 1's followed by a 0. Each block b essentially counts the number of 1's in an area of matrix T, when it is traversed in row-major order. In the example, each block b counts the number of 1's every five entries of T in row-major order. Inserting a relationship (l, o) results in the (virtual) insertion of a new column NC in T which, in turn, affects this counting since it affects the grouping of entries in sets of five. In the example, there is a single one in the first five entries of T before the insertion, and two 1's after the insertion. Procedure UpdateVectorB 1320 considers each block b in turn, and determines the effects of (virtually) adding column NC in matrix T. The possible effects of such an insertion are: (a) some of the 1's from block b' that is before block b in $V_B$ are carried over to b (line 3); (b) the position of 1's within a block is shifted (lines 5-8) and possibly some 1's need to by carried over to the next block b" of b (line 11); (c) a new one, that belongs to the inserted column, is added to b. By considering these cases, and with a single pass of the blocks in $V_{B_{old}}$, Procedure UpdateVectorB 1320 determines the contents of the blocks of $V_{B_{new}}$.

C. Index Decomposition

There are two main advantages in decomposing a single index structure into multiple sub-indexes:

1. Improved memory utilization: A single index used throughout the streaming system lifetime may become too big to fit into physical memory. This affects the performance of the index since secondary storage is accessed to answer a provenance query. Therefore, there are advantages into splitting the index into sub-indexes that fit in memory.

2. Improved processor utilization: Even the low-end desktops nowadays have multi-core CPUs. Therefore, the index should take advantage of this hardware. By decomposing the index into sub-indexes, this facilitates the parallel processing of sub-indexes during query evaluation.

Figure 14:
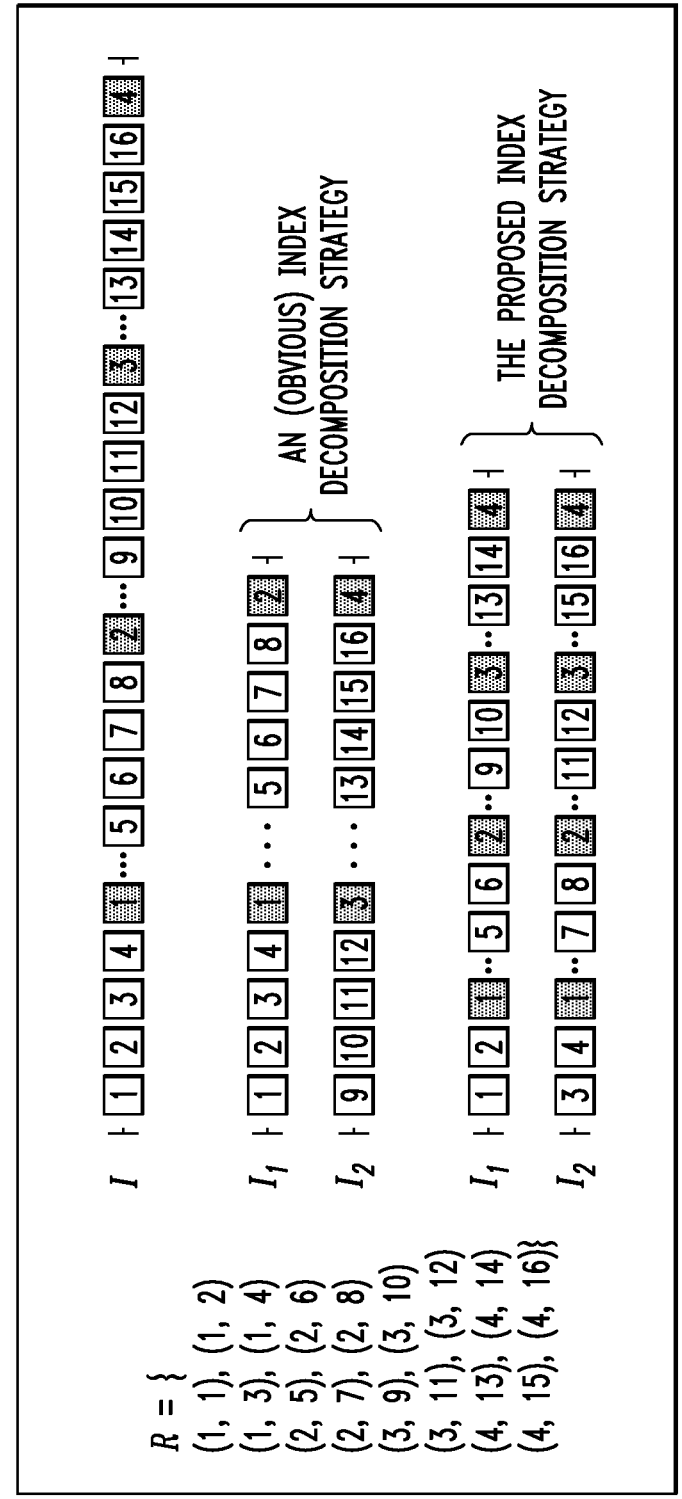
FIG. 14 shows alternative index decompositions according to one or more embodiments of the invention.

With this in mind, principles of the invention propose a decomposition in which the single index structure I is replaced by a set of C sub-indexes $I_1, I_2, \ldots, I_C$, with C being a parameter of the decomposition approach. In more detail, for each label l (or object o), let O represent the set of objects (respectively, L for the set of labels) returned by Procedure BackwardProv 750 (respectively, Procedure ForwardProv 710) of FIG. 7. While constructing the sub-indexes, set O is essentially divided in C subsets $O_1, O_2, \ldots, O_c$, each with cardinality |O|/C. There is a one-to-one correspondence between the constructed sub-indexes and the subsets of O, and each pair $(l, o_j)$, with $o_j \in O_i$, is indexed by $I_i$. In what follows, it is shown that the decomposition approach is guided by a property of the inventive index, called the locality property. Intuitively, a straightforward decomposition is to split the indexed relation R into a number of sub-relations, each sub-relation corresponding to a different epoch in the system's lifetime. To illustrate, in the left of FIG. 14 is shown a relation R with 16 (l, o) pairs, associating 4 labels with 16 objects. To the right of the figure, shown are various index strategies for R, where objects are depicted as white rectangles, labels as grey rectangles, and each label is depicted after the set of objects it is associated with in R. At the top of the figure, it is assumed that a single index I is built for all the (l, o) pairs in R, while in the middle of the figure the straightforward decomposition is used where this single index is split into two indexes, with $I_1$ indexing the first half of the relation which includes the pairs (l, o) for labels l=1 and l=2, and $I_2$ indexing the second half of the relation with pairs for the remaining two labels.

It is suggested here that this straightforward decomposition, although it does improve memory utilization (indexes $I_1$ and $I_2$ are smaller than I), it does not necessarily improve CPU utilization. To see why this is so, notice that the evaluation time of a backward provenance query for a label l (similarly, for forward queries and an object o—see FIG. 7) largely depends on the number of objects (respectively, labels) that are retrieved from the index for label l (respectively, object), that is, it depends on the cardinality of O (respectively, L). Indeed, it can be verified that the index structure exhibits the following locality property: the evaluation time of a query depends on the size of the answer set returned from the query and not on the size of the index overall. Therefore, for a label like l=2, the evaluation time of a backward provenance query using index I depends on the number of objects returned by the index, in this case 4 objects. Evaluating the same query, using the decomposition in the middle of FIG. 14, is expected to have the same running time, in spite of the fact that indexes $I_1$ and $I_2$ might be accessed in parallel by different processors, since 4 objects are still need to be retrieved from index $I_1$ (and no objects from index $I_2$). Due to the locality property, this time is approximately equal to retrieving 4 objects from index I.

Given the above, principles of the invention propose a decomposition (shown at the bottom of FIG. 14) that parallelizes (ideally using one CPU per sub-index $I_j$) the retrieval of objects, and therefore also improves CPU utilization. Now, a query for label l=2 retrieves only two objects from index $I_1$ and two from index $I_2$ which, if the indexes are accessed in parallel, more than halves the evaluation time of the provenance query.

III. Illustrative Implementations

Figure 15:
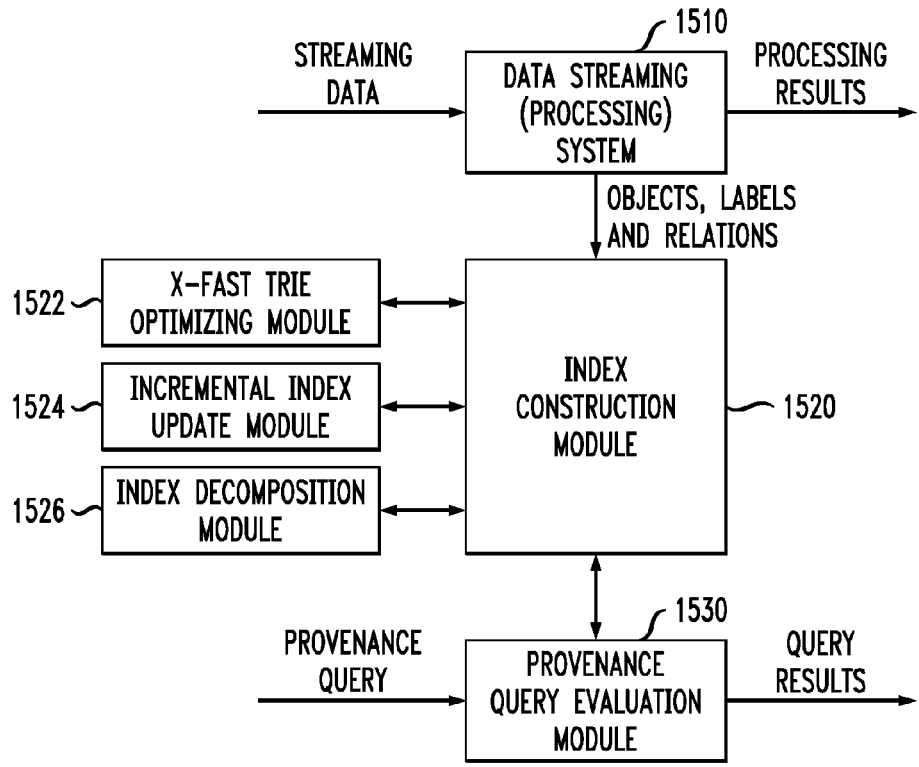
FIG. 15 shows an environment in which one or more of index construction and provenance query methodologies may be implemented according to one or more embodiments of the invention.

FIG. 15 depicts an illustrative environment 1500 in which one or more of the above-described index construction and provenance query methodologies may be implemented.

As shown, it is assumed that streaming data is received by data processing (data streaming) system 1510. The data processing system 1510 then processes this data in accordance with the application domain that the system supports. For example, consider the above healthcare scenario referred to in FIG. 1. A processing element (PE) of the data processing system 1510 may accept as input a stream of blood-pressure readings ("streaming data" shown in FIG. 15) and generate pre-hypertension alerts ("processing results" shown in FIG. 15). Of course, as mentioned above, the output of a PE can be used as an input to another PE, creating an arbitrary complex workflow of PEs, with elements from the streaming data (stream elements or SEs) flowing between these PEs.

Index construction module 1520 is the module in which the basic index construction algorithm 500 of FIG. 5 is executed (e.g., see subsection I.B. above). As explained above, input to the module is a binary relation R between a set of objects O and a set of labels L. To reiterate, the index uses the abstract concepts of objects and labels, i.e., given a PE, objects correspond to the input SEs of the PE, while labels correspond to output SEs. In addition, as explained above, the mapping of objects/labels to input/output SEs can be reversed, i.e., objects can be mapped to output SEs and labels to input SEs.

In any case, the index construction module 1510 generates the inventive index described herein. As explained above, the basic index structure may be optimized using one or more of the optimization techniques described above. That is, X-fast trie optimizing module 1522 may be employed to compress an X-fast trie to remove wasteful nodes (e.g., see subsection II.A. above). Incremental index update module 1524 may be used to build and maintain the index incrementally, as new inputs arrive and new outputs are produced (e.g., see subsection II.B. above). Index decomposition module 1526 may be used to decompose a single index into a number of smaller cooperating index structures (e.g., see subsection II.C. above).

Provenance query evaluation module 1530 then uses the index (preferably optimized using one or more of the optimizations) to evaluate a provenance query. Recall the example given above with respect to the healthcare domain: given a pre-hypertension alert (processing result of the data processing system 1510), a clinician issues a provenance query to retrieve the blood-pressure readings that resulted in the alert. Again, this is referred to as a backward provenance query which, given an output data item (e.g., medical alert) of some processing, the query retrieves all the inputs that contributed to its generation. Recall also that an example of a forward provenance query might be, given an abnormal blood-pressure reading, a clinician wants to check whether the reading has generated any alerts.

More specifically, provenance query evaluation module 1530 is the module in which the provenance query algorithms 700 of FIG. 7 are executed (e.g., see subsection I.C. above). The provenance query results are then provided in response to the provenance query.

It is to be appreciated that the construction module 1520, the optimization modules 1522, 1524 and 1526, and the provenance query evaluation module 1530 may be implemented as part of the data processing system 1510, or separate there from. The entire environment 1500 (or parts thereof) can be implemented in accordance with a computing architecture as illustrated and described below in the context of FIG. 16.

The techniques, for example as depicted in FIGS. 1-15, can also include, as described herein, providing a system, wherein the system includes distinct software modules (for example, an index construction module and/or a provenance query evaluation module executing on a hardware processor), each of the distinct software modules being embodied on a tangible computer-readable recordable storage medium.

Additionally, the techniques, for example as depicted in FIGS. 1-15, can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 16:
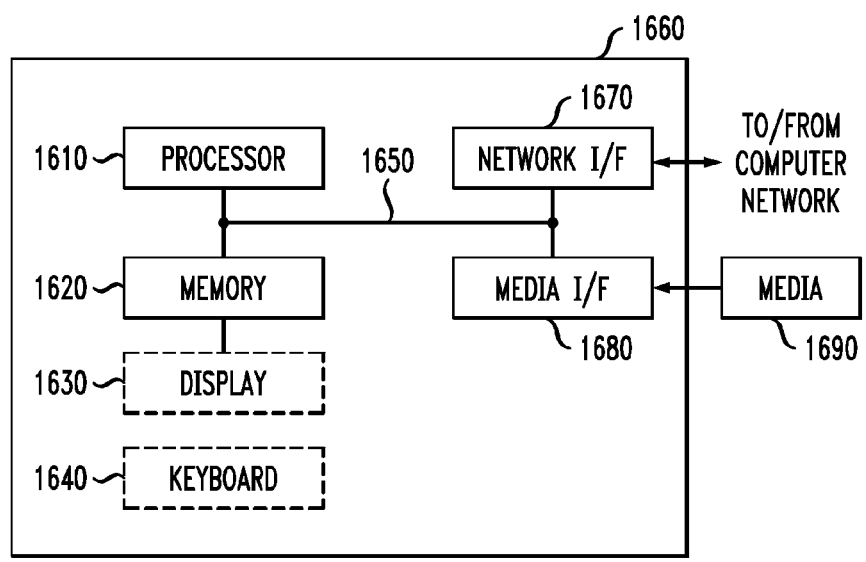
FIG. 16 shows a computer system that may be useful in implementing one or more aspects and/or elements of the invention.

One or more embodiments can make use of software running on a general purpose computer or workstation. With reference to FIG. 16, such an implementation employs, for example, a processor 1610, a memory 1620, and an input/output interface formed, for example, by a display 1630 and a keyboard 1640. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer). The processor 1610, memory 1620, and input/output interface such as display 1630 and keyboard 1640 can be interconnected, for example, via bus 1650 as part of a data processing unit 1660. Suitable interconnections, for example via bus 1650, can also be provided to a network interface 1670, such as a network card, which can be provided to interface with a computer network, and to a media interface 1680, such as a diskette or CD-ROM drive, which can be provided to interface with media 1690.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

It is to be appreciated that when the processor is "configured to" perform certain specified steps, in one embodiment, this means that the processor is able to: (i) access or load computer software including instructions or code, stored in a memory coupled to the processor, for performing the specified steps; and (ii) execute the computer software such that the specified steps are performed.

Furthermore, the invention can take the form of a computer program product accessible from a computer-usable or computer-readable medium (for example, media 1690) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 1620), magnetic tape, a removable computer diskette (for example media 1690), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or executing program code can include at least one processor 1610 coupled directly or indirectly to memory elements 1620 through a system bus 1650. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 1640, display 1630, pointing device, and the like) can be coupled to the system either directly (such as via bus 1650) or through intervening I/O controllers (omitted for clarity).

Network adapters such as network interface 1670 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer programs products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium; the modules can include any or all of the components shown in FIG. 15. The method steps can then be carried out using the distinct software modules and/or sub-modules of the system, as described above, executing on a hardware processor. Further, a computer program product can include a tangible computer-readable storage medium with code adapted to be executed to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, creating highly optimized applications that are tailored to the underlying computing and networking infrastructure.

It will be appreciated and should be understood that the exemplary embodiments of the invention described above can be implemented in a number of different fashions. Given the teachings of the invention provided herein, one of ordinary skill in the related art will be able to contemplate other implementations of the invention.

By way of example only, recall that in one illustrative encoding, labels were used to encode output items and objects to encode input items. This resulted in a structure where backward provenance queries can be evaluated in time independent to the size of the input/output streams but quadratic to the size of the answer set, and forward provenance queries that can be evaluated in time that increases slightly with the size of the input/output streams and is linear to the size of the answer set. Clearly, the performance for both types of queries is very satisfactory. However, nothing forbids us to reverse the initial encoding and use labels to encode input items and objects to encode output items. Then, the performance of backward and forward queries is also reversed. Depending on the application, on the characteristics of the streams, and the properties of the TVC rule, it might be desirable to use one encoding versus the other. For example, consider an application where (a) large data sets are expected (as one should in a streaming system); (b) output SEs only depend on a small number of input SEs; and (c) evaluation of backward provenance queries is of most interest. Then, the initial encoding offers the best alternative in this situation. However, in another setting where each output SE might depend on a very large number of input SEs, the quadratic performance might be prohibitive. Then, by swapping the encoding, a linear evaluation of backward provenance queries is guaranteed, in the number of these input SEs. All these are examples of the effectiveness of the index structure in terms of performance and also of its flexibility and ability to be customized to the specific application needs.

Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for processing one or more queries directed toward data associated with a data processing system, the method comprising steps of:

mapping one or more data items of a first data set associated with the data processing system to a first representation type, wherein the data items of the first data set comprise output data items;

mapping one or more data items of a second data set associated with the data processing system to a second representation type, wherein the data items of the second data set comprise input data items;

computing a bi-directional index of a data provenance relation existing between the data items of the first data set and the data items of the second data set, wherein the bi-directional index is computed in terms of the first representation type and the second representation type, wherein the first representation type comprises labels and the second representation type comprises objects, and wherein the bi-directional index is a persistent structure that does not store annotations of the data items, wherein computing a bi-directional index comprises:

creating a first binary matrix, wherein rows of the first binary matrix represent labels, columns of the binary matrix represent objects, and an entry [i, j] in the first binary matrix is set to a first binary value when a label of row i is associated with an object of column j for a given data provenance relation; and computing a plurality of vectors based on entries of the first binary matrix, the plurality of vectors comprising a compressed representation of entries of the first binary matrix;

performing a provenance query evaluation using the bi-directional index, in response to receipt of a provenance query, wherein the bi-directional index is used for the query evaluation whether the received provenance query is a backward provenance query or a forward provenance query, wherein a backward provenance query provides an indication as to which input data items, generate a specific output data item, and wherein a forward provenance query provides an indication as to what influence an input data item has on a generation of which output data items, wherein the provenance query evaluation is performed using the bi-directional index without access to the input and output data items, wherein performing the provenance query evaluation comprises performing a search over the compressed representation of entries of the first binary matrix provided by plurality of vectors; and generating a response for the received provenance query based on a result of the query evaluation;

wherein the mapping, computing, performing, and generating steps are executed on a computing system comprising a processor and a memory, wherein one or more software modules for implementing the mapping, computing, and performing steps are loaded from the memory and executed by the processor.

2. The method of claim 1, wherein the plurality of vectors include a column vector and a row vector that are computed based on entries in the first binary matrix.

3. The method of claim 2, wherein the column vector is used to compute a second binary matrix from which first and second vectors are computed based on entries in the second binary matrix.

4. The method of claim 3, wherein the row vector is used to compute one or more storage constructs.

5. The method of claim 2, wherein evaluation of the bi-directional index for a forward provenance query comprises using one or more of the column vector and the row vector.

6. The method of claim 5, wherein the forward provenance accepts as an input a given object and returns as an output a set of labels associated with the given object.

7. The method of claim 2, wherein evaluation of the bi-directional index for a backward provenance query comprises using one or more of the column vector and the row vector.

8. The method of claim 7, wherein the backward provenance accepts as an input a given label and returns as an output a set of objects associated with the given label.

9. The method of claim 1, wherein the first data set associated with the data processing system and the second data set associated with the data processing system are identical.

10. The method of claim 1, further comprising the step of reversing a directionality of the mapping step.

11. The method of claim 1, further comprising the step of incrementally maintaining the bi-directional index as one or more new data provenance relations are established.

12. The method of claim 1, further comprising the step of decomposing the bi-directional index into a set of sub-indexes.

13. The method of claim 1, further comprising the step of compressing the bi-directional index.

14. Apparatus for processing one or more queries directed toward data associated with a data processing system, the apparatus comprising:

a memory; and a processor coupled to the memory and configured to:

(i) map one or more data items of a first data set associated with the data processing system to a first representation type, wherein the data items of the first data set comprise output data items, and to map one or more data items of a second data set associated with the data processing system to a second representation type, wherein the data items of the second data set comprise input data items;

(ii) compute a bi-directional index of a data provenance relation existing between the data items of the first data set and the data items of the second data set, wherein the bi-directional index is computed in terms of the first representation type and the second representation type, wherein the first representation type comprises labels and the second representation type comprises objects, and wherein the bi-directional index is a persistent structure that does not store annotations of the data items, wherein computing a bi-directional index comprises:

creating a first binary matrix, wherein rows of the first binary matrix represent labels, columns of the binary matrix represent objects, and an entry [i, j] in the first binary matrix is set to a first binary value when a label of row i is associated with an object of column j for a given data provenance relation; and computing a plurality of vectors based on entries of the first binary matrix, the plurality of vectors comprising a compressed representation of entries of the first binary matrix;

(iii) perform a provenance query evaluation using the bi-directional index, in response to receipt of a provenance query, wherein the bi-directional index is used for query evaluation whether the received provenance query is a backward provenance query or a forward provenance query, wherein a backward provenance query provides an indication as to which input data items generate a specific output data item, and wherein a forward provenance query provides an indication as to what influence an input data item has on a generation of which output data items wherein the provenance query evaluation is performed using the bi-directional index without access to the input and output data items, wherein performing the provenance query evaluation comprises performing a search over the compressed representation of entries of the first binary matrix provided by plurality of vectors; and (iv) generate a response for the received provenance query based on a result of the query evaluation.

15. The apparatus of claim 14, wherein the processor is further configured to incrementally maintain the bi-directional index as one or more new data provenance relations are established.

16. The apparatus of claim 14, wherein the processor is further configured to decompose the bi-directional index into a set of sub-indexes.

17. The apparatus of claim 14, wherein the processor is further configured to compress the bi-directional index.

18. The apparatus of claim 14, wherein the plurality of vectors include a column vector and a row vector that are computed based on entries in the first binary matrix.

19. The apparatus of claim 18, wherein the column vector is used to compute a second binary matrix from which first and second vectors are computed based on entries in the second binary matrix, and wherein the row vector is used to compute one or more storage constructs.

20. The apparatus of claim 18, wherein evaluation of the bi-directional index for a forward provenance query comprises using one or more of the column vector and the row vector, wherein the forward provenance accepts as an input a given object and returns as an output a set of labels associated with the given object.

21. The apparatus of claim 18, wherein evaluation of the bi-directional index for a backward provenance query comprises using one or more of the column vector and the row vector, and wherein the backward provenance accepts as an input a given label and returns as an output a set of objects associated with the given label.

22. The apparatus of claim 14, wherein the processor is further configured to decompose the bi-directional index into a set of sub-indexes.

23. The apparatus of claim 14, wherein the processor is further configured to incrementally maintain the bi-directional index as one or more new data provenance relations are established.

24. The apparatus of claim 14, wherein the processor is further configured to compress the bi-directional index.

25. A computer program product comprising a non-transitory computer readable storage medium including computer usable program code stored thereon for processing one or more queries directed toward data associated with a data processing system, the computer program product comprising:
  computer usable program code for mapping one or more data items of a first data set associated with the data processing system to a first representation type, wherein the data items of the first data set comprise output data items, and for mapping one or more data items of a second data set associated with the data processing system to a second representation type, wherein the data items of the second data set comprise input data items;
  computer usable program code for computing a bi-directional index of a data provenance relation existing between the data items of the first data set and the data items of the second data set, wherein the bi-directional index is computed in terms of the first representation type and the second representation type, wherein the first representation type comprises labels and the second representation type comprises objects, and wherein the bi-directional index is a persistent structure that does not store annotations of the data items, wherein computing a bi-directional index comprises:
    creating a first binary matrix, wherein rows of the first binary matrix represent labels, columns of the binary matrix represent objects, and an entry [i, j] in the first binary matrix is set to a first binary value when a label of row i is associated with an object of column j for a given data provenance relation; and
    computing a plurality of vectors based on entries of the first binary matrix, the plurality of vectors comprising a compressed representation of entries of the first binary matrix;
  computer usable program code for performing a provenance query evaluation using the bi-directional index, in response to receipt of a provenance query, wherein the bi-directional index is used for query evaluation whether the received provenance query is a backward provenance query or a forward provenance query, wherein a backward provenance query provides an indication as to which input data items generate a specific output data item, and wherein a forward provenance query provides an indication as to what influence an input data item has on a generation of which output data items, wherein the provenance query evaluation is performed using the bi-directional index without access to the input and output data items, wherein performing the provenance query evaluation comprises performing a search over the compressed representation of entries of the first binary matrix provided by plurality of vectors; and
  computer usable program code for generating a response for the received provenance query based on a result of the query evaluation.

* * * * *